United States Patent [19]

Bacardit

[11] Patent Number: 4,565,115
[45] Date of Patent: Jan. 21, 1986

[54] HYDRAULIC DISTRIBUTOR FOR ASSISTANCE POWER MOTOR WITH RETURN TO REST POSITION

[75] Inventor: Juan S. Bacardit, Barcelona, Spain

[73] Assignee: Bendiberica S.A., Barcelona, Spain

[21] Appl. No.: 404,118

[22] Filed: Aug. 2, 1982

[30] Foreign Application Priority Data

Aug. 4, 1981 [ES] Spain .................................. 505159

[51] Int. Cl.[4] ................................................ F15B 9/10
[52] U.S. Cl. ................................... 91/375 A; 91/396; 91/405; 180/132
[58] Field of Search ............... 91/375 A, 395, 396, 91/401, 404, 405, 375 R, 374, 406, 409; 180/132, 141

[56] References Cited

U.S. PATENT DOCUMENTS

| | | | |
|---|---|---|---|
| 3,118,349 | 1/1964 | Combs | 91/404 |
| 3,238,850 | 3/1966 | Desmarchelier | 91/394 |
| 3,322,039 | 5/1967 | Madland | 91/405 |
| 3,896,703 | 7/1975 | Bertanza | 91/401 |
| 4,008,782 | 2/1977 | Chanal | 180/132 |
| 4,310,024 | 1/1982 | Bacardit | 91/375 R |
| 4,335,749 | 6/1982 | Walter | 91/375 A |
| 4,421,010 | 12/1983 | Elser | 91/375 A |

FOREIGN PATENT DOCUMENTS

| | | |
|---|---|---|
| 0002328 | 6/1979 | European Pat. Off. . |
| 2216468 | 9/1974 | France . |
| 2279962 | 2/1976 | France . |
| 2028240 | 3/1980 | United Kingdom . |
| 1576153 | 10/1980 | United Kingdom . |
| 2081193 | 2/1982 | United Kingdom . |
| 2083784 | 3/1982 | United Kingdom . |
| 2090569 | 7/1982 | United Kingdom . |
| 620687 | 8/1978 | U.S.S.R. .................................. 91/395 |

*Primary Examiner*—Edward K. Look
*Attorney, Agent, or Firm*—Larry J. Palguta; Ken C. Decker

[57] ABSTRACT

The distributor defines two parallel fluid circuits (15, 16) each including serially arranged first (1;1') and second (2;2') valve means actuated by the primary control member (OP) of the distributor, two distribution lines (17, 18) for selectively supplying the chambers of an assistance motor-actuator (12) deriving from said circuits (15, 16) downstream the primary valve means (1;1'), and two additional return valve means (3;3'), upstream said second valve means (2;2') coupled to the piston (13) of the actuator (12) to form a restriction in the return circuit from the actuator chamber in relieved condition and thus create an over-pressure enabling effective return of the actuator to neutral position after return of distributor to rest condition.

9 Claims, 10 Drawing Figures

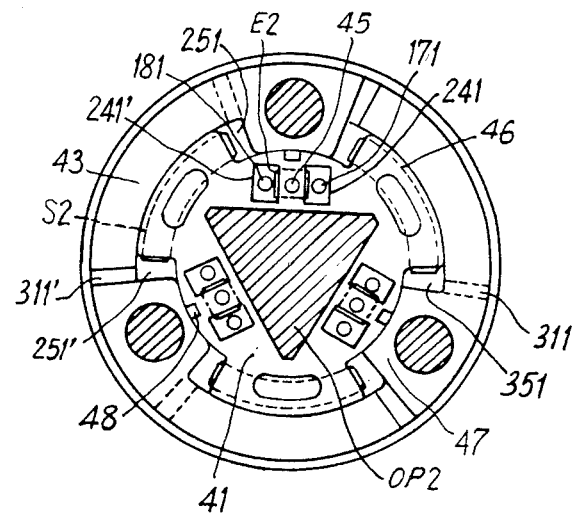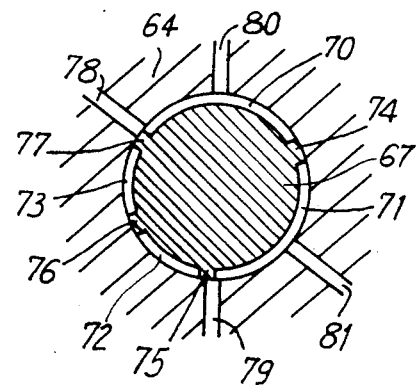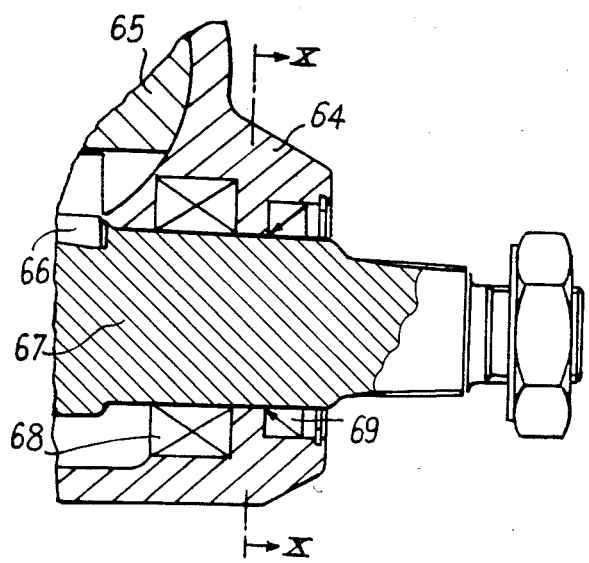

HYDRAULIC DISTRIBUTOR FOR ASSISTANCE POWER MOTOR WITH RETURN TO REST POSITION

The invention concerns hydraulic distributors, of the type including a primary member linked to an actuating device and displaceable with respect to a secondary member which is stationary or linked to an output power unit assisted by a double action hydraulic motor, defining two parallel pressurized flow fluid circuits between a pressure source and a return output, a working conduit leaving from each parallel circuit between first and second valve means of each circuit actuated by displacement of the primary member, and connected to a corresponding end of the motor, so as to alternately connect the work conduits to the pressure source or to the return.

Such a type of distributor finds a typical application in the power steering circuits of automotive vehicles, where the primary member is actuated by the steering wheel and where the hydraulic servo-assisting power motor can be incorporated in the steering box or form a separate assembly connected by a system of functional links to the steering mechanism. For simplification purposes, the following description will refer to power steering circuits even though this example is not limitative.

In a power steering circuit of this type, return of the mechanism to central position (wheels parallel to main axis of the vehicle) after a given angular movement has been achieved from this position depends on various factors which are designated normally under the appellation "specific reversability of the vehicle". The fact that the mechanism perfectly returns to central or rest position, depends primarily on the geometric design of the steering mechanism which in turn is affected by various parameters such as normal wear of tires (convergences) and dynamic or cinematic characteristics of the vehicle. In standard systems, it is practically impossible that the wheels return exactly to central position when the vehicle is stopped or when it is moving at very slow speed.

The object of this invention is to solve this problem, by providing therefor improvements, applicable to hydraulic circuit mechanisms of the above class, enabling with simple, compact and reliable arrangements the power steering to automatically return to central position independently of vehicle characteristics or speed.

In order to achieve this object and others, in compliance with the present invention, a return valve means is inserted in each parallel fluid flow circuit, between the working conduit connection point and the second valve means (downstream or on return side), said return valve means being actuated in response to the movement of the hydraulic motor piston so that each one creates a restriction in the return circuit of that motor chamber in exhaust relief condition during operation of the motor, thereby causing the pressure in that chamber to increase when the distributor is returned to rest or central position and the hydraulic motor is not in rest position.

When the distributor returns to central position, the actuating pressure in the motor control chamber, produced through prior manipulation of steering mechanism, is in fact released and a differential pressure will thus be created between the two chambers of the motor, precisely in the opposite direction to the previous movement, so as to move the mechanism and effectively return it to central position.

According to a feature of the invention, the return valve means are mechanically coupled to the piston of the power steering hydraulic motor and include a common slide valve member formed by the piston itself or by a stationary rod extending through this piston.

Other features and advantages of the invention will appear from the following description of different embodiments which are given for guidance and not limitative purposes and related to appended drawings wherein.

Figure 3:
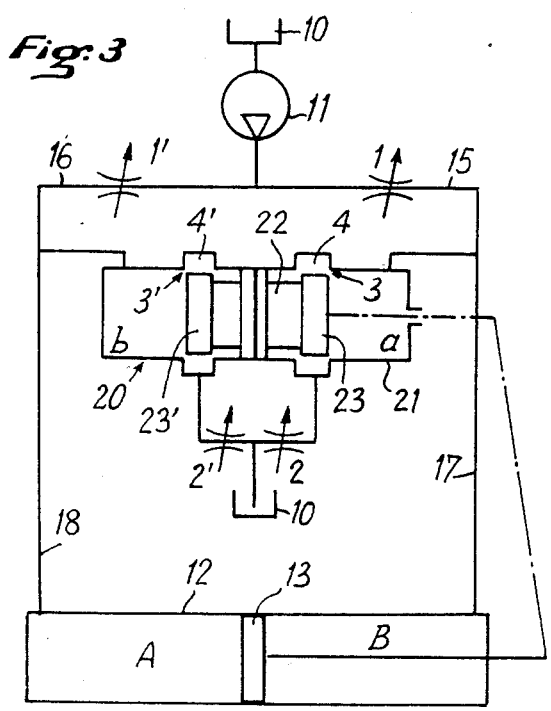
Figure 4:
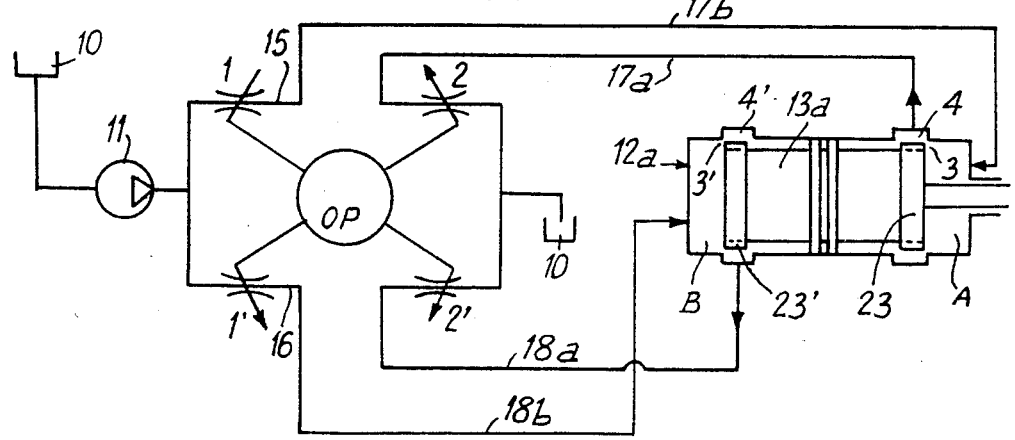
Figure 5:
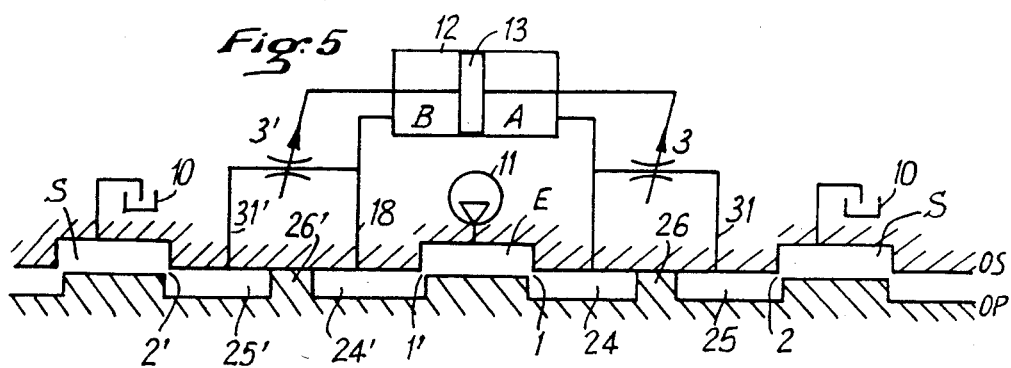
Figure 6:
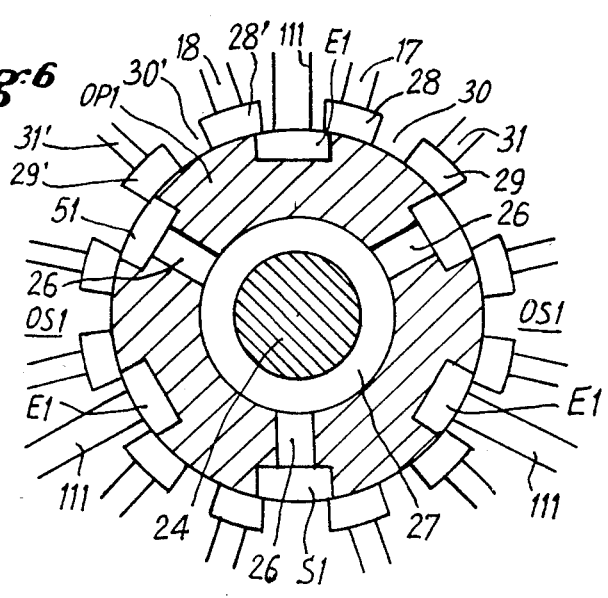
Figure 7:
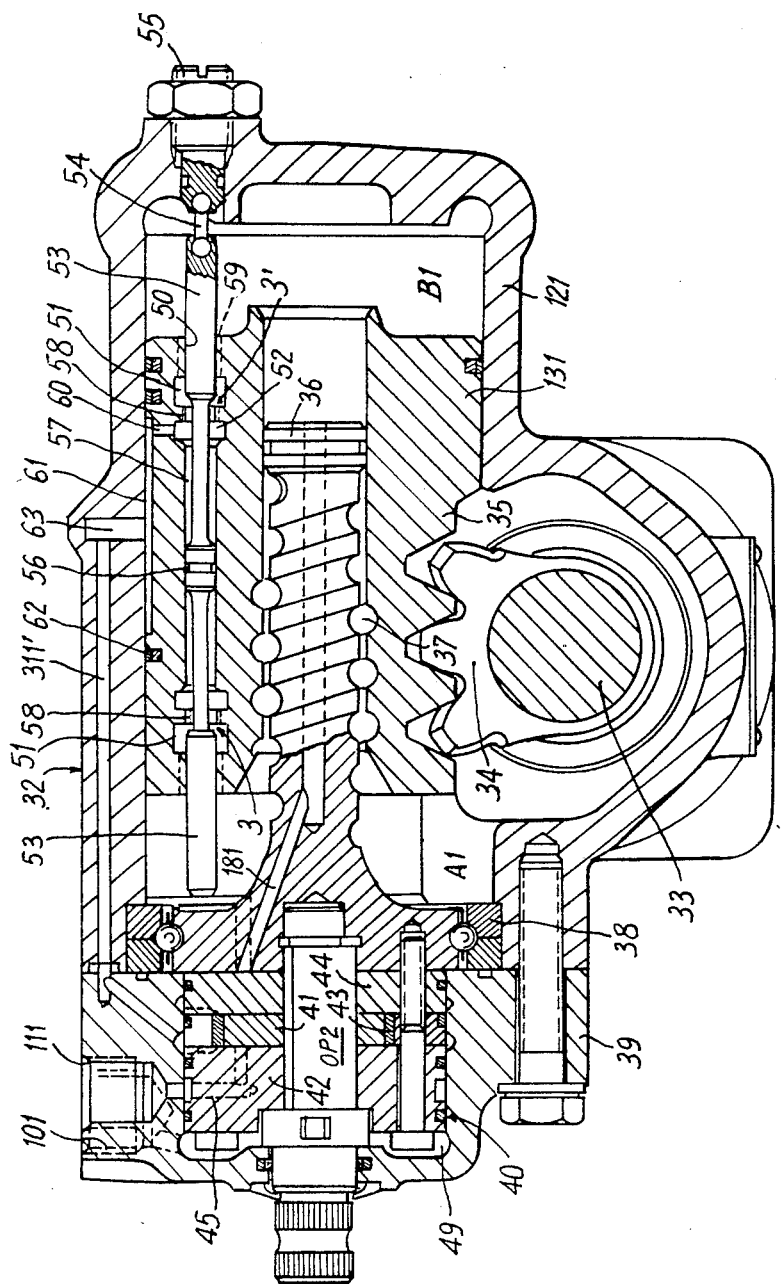

FIG. 3 schematically illustrates an embodiment of such a system wherein both return valve means are shown in the form of a common slide valve member coupled to the power steering piston;

FIG. 4 shows an alternative embodiment of the previous figure, wherein the return valve means are incorporated in the power steering motor;

FIG. 5 schematically shows the integration of the return valve means between the two relatively displaceable members of the power steering system distributor;

FIG. 6 shows the corresponding design of a groove-type rotary distributor;

FIGS. 7 and 8 show the arrangement of the FIG. 5 system in a steering unit equipped with a star-type rotary distributor; and FIGS. 9 and 10 show an example of integration of the return valve means on the output driven shaft of a power steering unit.

Figure 1:
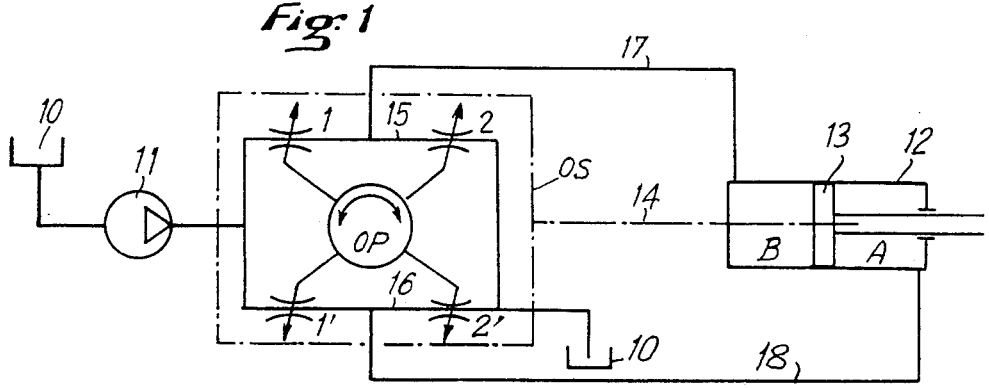
FIG. 1 is an operation diagram showing a power steering hydraulic system according to the previously defined prior art.

The operating principle of a standard power steering system can be illustrated by the diagram of FIG. 1, where 10 depicts the hydraulic fluid return reservoir, 11 is the pressure pump, 12 the power steering assistance hydraulic actuator, the piston 13 of which separates the two working chambers A and B, 1-2 and 1'-2 depicting the first and second variable restriction valve means located respectively in two parallel fluid flow circuits 15 and 16 between the source 11 and the reservoir 10, and coupled on one hand to a primary distributor member OP controlled by the steering wheel, and on the other hand to the piston 13 or to another part of the mechanism moving in synchronism with the latter by means of a secondary distributor member OS the structure of which varies according to the different design types of steering mechanisms.

In order to facilitate the description, it will be supposed that all the restriction valve means are part of a groove or star-type hydraulic rotary distributor, operating in the open center principle, even though it is evident that the invention can also be applied to other types of distributors. Consequently, it will be supposed that a clockwise rotation of the primary member OP will result in a progressive closure of restrictions 1' and 2 while a counterclockwise rotation will result in a closure of restrictions 1 and 2'. In the first instance, there will be a pressure increase created in the upper parallel circuit 15 (including restrictions 1 and 2), this overpressure reaching, via line 17 derivating upper circuit 15 between the first and second restrictions 1 and 2, to chamber B of power actuator 12 to move piston 13 to the right of the figures. In the second instance, the operation is obviously in the reverse direction, the overpressure in circuit 16, upstream the second restriction, being transmitted via line 18 to the other actuator chamber A. Because of cinematic connections between primary and secondary units on one hand and between the secondary unit and the steering mechanism on the other hand, symbolized by dotted line 14, when the distributor has returned to central or rest position after a given travel of piston 13, the pressures are equalized in both parallel circuits, and consequently in chambers B and A of power actuator 12, so that the power system is made completely inoperative or deactivated; thus it follows that return of the steering mechanism to central position can only be obtained on the basis of mechanical parameters depending on speed or design of the vehicle, which become nonexistent at slow speed or when the vehicle is stopped.

As above mentioned, the object of this invention is to solve these problems by offering improvements to hydraulic distributors of the above disclosed class, which enable the steering assembly to be hydraulically returned to central position, regardless of running conditions of the vehicle and particularly during parking maneuvers.

Figure 2:
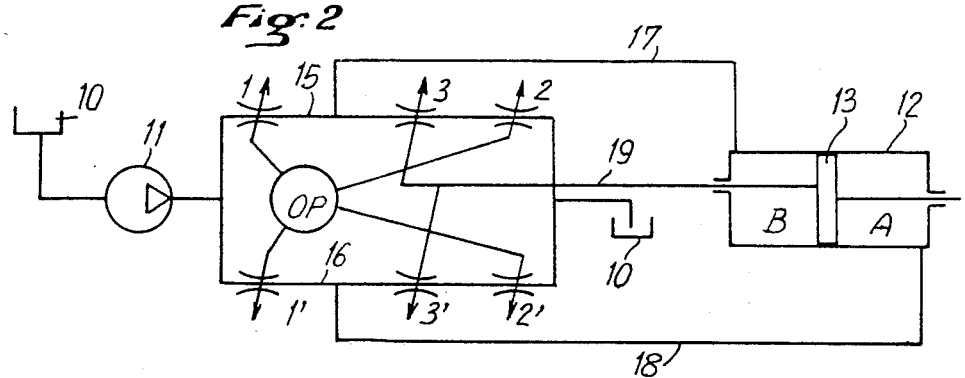
FIG. 2 is a diagram similar to the previous diagram, showing the operating principle of a hydraulic distribution system according to the invention.

For this purpose, as shown on FIG. 2, there are interposed in the two parallel circuits 15 and 16, between the connection points with lines 17 and 18 leading to chambers B and A of power actuator 12 and the second (or downstream) restrictions 2 and 2' corresponding to the return side, an additional pair of variable restriction valve means 3, 3' actuated by the steering mechanism through a cinematic link symbolized by the axis 19, so that at any moment during operation there is a tendency to close restriction 3 or 3' corresponding to that of parallel circuits 15 or 16 in a relief or discharge phase to reservoir 10. In other words, when considering the above-mentioned instance where the primary member OP is actuated in the clockwise direction so as to close restrictions 1' and 2, while restrictions 1 and 2' are held constant or open, the pressure increases in upper circuit 15 and creates a hydraulic flow in line 17 towards chamber B of the actuator while the fluid contained in the other chamber A is simultaneously exhausted by line 18 and the downstream section of circuit 16 to be discharged into the reservoir via restriction 2'. In such an occurence, according to the invention, closure of additional restriction 3' in relieved circuit 16, provokes a pressure rise in chamber A which is less than the actuating pressure in chamber B but which persists however, when at the end of the maneuver, the pressure in connecting conduits to actuator chamber B drops, in other words when the distributor is returned to central position. Consequently, the steering system is automatically actuated in the opposite direction until restrictions 3 and 3' return to rest position as a result of effective return of the steering mechanism to central position.

When the primary member OP is actuated in counter-clockwise direction, the same procedure is symmetrically repeated, while causing this time restriction 3 of circuit 15 to be operated.

It should be understood that restrictions 1, 2 and 1', 2' retain the same cinematic coupling 14 than in the embodiment described in relation with FIG. 1.

The operating sequence according to the invention can be used in different ways according to the type of steering mechanism to which it is applied.

FIG. 3 thus shows the schematic diagram of FIG. 2 modified so that both additional restrictions 3, 3' are incorporated in an independent slide valve means, generally designated by reference 20, wherein the integers which are common to the embodiment of FIG. 2 are marked with the same reference numbers.

Valve means 20 includes a cylinder 21 closed at both ends and provided internally with two annular openings 4 and 4' axially separated one from the other. A piston 22 sealingly slides axially in the cylinder, defining two opposite chambers a, b, the piston 22 including two end cylindrical discs 23 and 23' which face the annular openings 4 and 4' when the piston is in central or idle position so as to define the above additional restrictions 3 and 3' peripherally with the edges of the openings, as shown in FIG. 3.

FIG. 3 clearly illustrates the layout of the circuits of FIG. 2 as well as the operation described in reference thereto, the parallel circuits 15 and 16 incorporating chambers a and b from which leave the distribution lines 17 and 18, the restrictions 2 and 2' being located immediately downstream openings 4 and 4', respectively.

FIG. 4 shows the possibility of integrating slide valve means 20 of FIG. 3 in the assistance power actuator, the cylinder 12a and piston 13a of which are conformed to act as the above described corresponding members 12 and 13, and are equipped with the same components as slide valve means 20 of FIG. 3 (with the same references), so as to form the additional restrictions 3 and 3'. In this case, the annular openings 4 and 4' of the power cylinder/slide valve 12a assembly (12–30) are respectively connected by lines 17a and 18a to the inputs of the downstream restrictions 2 and 2' of the hydraulic distributor, while chambers A and B of the actuator are respectively connected to the outputs of upstream restrictions 1 and 1' of the distributor by lines 17b and 18b. Naturally the same functional circuits are retained as for FIG. 2, the operating sequences being exactly the same as those described in relation with FIGS. 2 and 3.

FIG. 5 schematically shows an embodiment wherein the additional return restrictions 3 and 3' are incorporated in the power steering control distributor itself. FIG. 5 can be considered as the diagram of a linear slide distributor or a developed diagram of a rotary distributor with longitudinal grooves or a star-shaped rotor. There is also here a primary member OP which receives steering wheel movement, and a secondary member OS which is linked to or is part of the steering mechanism. The secondary distributor member OS is formed with input openings E connected to pressure source 11 and, symmetrically on both sides of each input opening E, with output openings S connected to reservoir 10. The primary member OP comprises passage cavities 24 and 24' on each side of each input opening E (in central position of the distributor) and passage cavities 25, 25' on each side of each return or output opening S. The cavities and openings of both members OP and OS mutually cooperate according to the known principle of an open center distributor and define therebetween the restrictions 1, 2 and 1', 2' corresponding to the restrictions with the same reference numbers described in the previous embodiments. Cavities 24 and 25 on one hand, and 24' and 25' on the other hand, are mutually separated respectively by intermediate partitions 26 and 26' of the primary member OP, which cooperate in sealing relationship with corresponding facing surfaces of the secondary member OS. The distribution lines 17 and 18, connected to the corresponding chambers A, B of power actuator 12, lead from cavities 24, 24', and the additional restrictions 3 and 3'—which can be obtained according to any of the above disclosed techniques, are inserted in lines interconnecting adjacent cavities 24 and 25 on the one hand, and 24' and 25' on the other hand.

It should be appreciated that, in this case, there are also the two parallel circuits which lead from pressure source 11 to reservoir 10 via input opening E, upstream restriction 1, cavity 24, additional restriction 3, chamber 25, downstream restriction 2 and opening S for circuit 15, and via the same circuit elements carrying prime references for the other circuit 16.

The operation of the system is obviously the same as before, assuming that the clockwise rotation in the previous cases is substituted here by a movement to the right, on FIG. 5, of the primary member OP with respect to the secondary member OS, and conversely.

Certain forms of practical construction of the above schematically described systems will now be described in detail.

It was indicated that the diagram of FIG. 5 can correspond to development of a rotary type distributor with longitudinal grooves, for example such as shown in FIG. 6, including a cylindrical rotor or primary member OP1 rotatably mounted in a complementarily shaped cylindrical cavity formed in a stator or secondary member OS1. The driving movement receiving primary member is coupled to the secondary member so that said latter can selectively transmit the movement to the steering mechanism, through a dead travel coupling (not shown), which thus authorizes a relative displacement of both distributor members to perform the hydraulic distributor function, and through a central torsion bar, the cross-section of which is shown at 24, which is used to hold these members in mutually centered rest position, as known in the art.

In the embodiment of FIG. 6, which is a transversal cross-section of the distributor, the stator OS1 includes three radial channels 111 connected to the pressure fluid input of the distributor unit. In the centered or rest position of the distributor, these channels are located so as to face corresponding longitudinal grooves E1 angularly distributed on the lateral peripheral surface of the rotor OP1. Between these input grooves E1, other evenly angularly distributed grooves S1 communicate through radial conduits 26 with the central cavity 27 of the distributor rotor, which is extended to one end of the steering unit (according to its construction) to be connected to the external discharge or return circuit towards the reservoir. Both sets of grooves E1 and S1 obviously correspond to openings E and S of FIG. 5.

On one side of each input groove E1, the internal surface of the stator OS1 is formed with two adjacent longitudinal grooves 28 and 29 separated by an intermediary partition 30 which is hermetically adjusted to the surface of rotor OP1, and from which lead a distribution line 17 (FIG. 5) towards the upstream side of the additional return restriction 3 and towards chamber A of power cylinder 12, and a return line 31 connected to the opposite end (downstream) of said return restriction 3, respectively. The edges of the distribution groove 28 and return groove 29 opposite to intermediary partition 30, cooperate in relation of an open center valve with two adjacent grooves E1 and S1 of rotor OP1. The other side of each input groove E1 has a corresponding symmetrical set of stator grooves designated by the same "prime" references.

It can be seen that the grooves E1 and S1 of the rotor and of the stator 28 and 29, and the symmetrical grooves, correspond to openings E and S on one hand, and to cavities 24 and 25 on the other hand, of FIG. 5, so that the operation of device in FIG. 6 is exactly the same as that of FIG. 5 with the difference being that a displacement to the right of primary member OP of FIG. 5 corresponds to a clockwise rotation of rotor OP1 of FIG. 6.

FIGS. 7 and 8 show another embodiment of the invention, wherein the hydraulic fluid return system is applied to a power steering unit equipped with a hydraulic reaction star-shaped distributor of the type described in detail in British Pat. No. 1 576 153 and corresponding U.S. Pat. No. 4,459,897 issued July 17, 1984 in the name of applicant, the content of which is supposed integrated here for reference, so that only the main components and those specific to the invention will be described.

The steering servo unit, designated by the general reference number 32, includes an output shaft 33 to the steering mechanism equipped with a toothed sector 34 which meshes with the rack integrated to the piston/nut 131 sliding in the cylinder 121 forming the two working chambers A1 and B1. Piston/nut 131 is actuated by a worm screw 36, by means of ball bearing race 37. Screw 36 rotates in a ball bearing 38 fixed in the opening of the unit casing by a cover 39, inside of which the hydraulic star-shaped distributor is located, the assembly being crossed by the actuating shaft OP2 of the primary member, to which the vehicle steering wheel transmission can be normally connected. Inside distributor 40, the primary member consists in a star-shaped flat rotor 41 rotatably mounted in a disc-shaped cavity defined by an assembly formed by three coaxially stacked circular plates 42, 43 and 44, in turn rotatably mounted in a bore of cover 39.

In the illustrated example, the end plates 42 and 44 define three input openings E2 which communicate through conduits 45 with the hydraulic fluid input 111 of the unit. On both sides of each input opening, the rotor includes distribution cavities 241 and 241' from which conduits 171 and 181 lead to the chambers A1 and B1, respectively. The star-shaped rotor 41 is here formed with three radial arms 46 and the intermediate plate 43 includes three internal radial protrusions 47 which hermetically slidingly cooperate with the rotor body by seals 48 so as to define in the disc-shaped cavity, between these arms and protrusions, return chambers 251 and 251' into which open return conduits 311 and 311' via return restrictions as will be explained, the second conduit being only visible on FIG. 7. The end plates 42 and 44 also include openings S2 which communicate through conduits (not shown) with a front chamber 49 in the cover and the return fluid output of the unit, respectively.

A hole 50 is drilled through piston 131 parallel to its axis, which includes, near each end, an annular outer chamber 51 and an annular internal chamber 52. A rod 53 is slidingly received within this bore, the ends of which protrude into chambers A1 and B1 of actuator cylinder 121. The end of the rod in chamber B1 is attached to the wall of the cylinder by a ball joint 54 and an adjustment screw 55 for adjustment of axial position of the rod. The latter seals centrally the bore 50 by means of an annular center seal 56 on both sides of which the rod has portions of reduced diameter 57, the external edges of which are located, in the central rest position of the piston shown by FIG. 7, in the outer annular chambers 51, in facing axial relationship with central openings 58 intercommunicating the outer chambers with corresponding internal chambers 52, so as to form the return restrictions 3 and 3'. Openings 58 have accordingly a diameter equal or slightly larger than that of the ends of the rod. The axially outer sides of the reduced diameter sections of the rod are appropriately chamfered and each opening 58 can be equipped with splines or grooves to obtain the desired variation of fluid flow passage between the two coaxially arranged elements and prevent total closing of the restrictions. On each side of the piston, the outer annular chamber 52 communicates with the adjacent working chamber A or B of the cylinder by means of longitudinal grooves 59 in the bore. Each internal annular chamber 52 communicates by a radially extending hole 60 with a longitudinal groove 61 formed in the peripheral surface of the piston 131 and closed axially by annular seals 62 for isolation from inside of the cylinder which includes in its wall a cavity 63 into which opens conduit 311 or 311'. On FIG. 7 only the fluid flow circuit comprising conduit 311' can be seen, but it is understood that a similar assembly located in a cross-section different from that of the figure realizes the circuit corresponding to conduit 311 of FIG. 8.

Operation of this return system is very simple. When piston 131 is displaced to the right because the distributor sends pressurized fluid to chamber A1, chamber B1 empties through grooves 59, right external chamber 51, variable restriction 3', adjacent internal chamber 52, hole 60, groove 61 and conduit 311' to output circuit of the distributor. Thus, the passage opening 58 on right hand side of the Figure moves in the same direction in relation to rod 53 and restriction 3' progressively closes, thereby creating a pressure rise in chamber B1 which, when the distributor returns to rest position, enables the piston 113 to be pushingly returned to the left back to its central rest position, as previously described. Actually, a symmetrical operation occurs when piston 131 is displaced to the left of Figure under action of distributor 40.

Another alternative practical embodiment according to the invention is shown on FIGS. 9 and 10. Reference 64 designates the steering unit casing, where one can see part of piston 65, gear 66 and output shaft 67 which protrudes outside of the unit after crossing a bearing 68 and a retaining ring 69. In that part of the drive shaft between said two latter units, several peripheral grooves are formed, namely 70, 71, 72 and 73 angularly distributed in a same cross-section and mutually separated by radial partitions 74, 75, 76 and 77. Radial conduits 78 and 79, which normally communicate respectively with grooves 70 and 73 via restrictions formed by partitions 77 and 75, are formed in the area of the unit casing radially facing these grooves and are connected to the distributor, while radial conduits 80 and 81, normally communicating with the grooves 70 and 71, are connected to the power cylinder chambers formed in casing 64, respectively.

The operation in this case is similar to that described in the preceding embodiments.

I claim:

1. A combination hydraulic distributor and double-action hydraulic assistance motor, the hydraulic distributor comprising a primary member connected to an input control device and displaceable in relation to a second member connected to an output device operatively coupled to the double action hydraulic assistance motor having a piston, said primary and secondary members defining mutually two parallel pressure fluid flow circuits between a source of pressure and a reservoir, working conduits each leading to an associated chamber of said hydraulic assistance motor and being connected to an intermediate portion of a respective parallel pressure fluid flow circuit between first and second modulable valve means serially arranged in each said parallel pressure fluid flow circuit, the first and second valve means actuated by movement of said primary member relative to said secondary member from a rest position of the members so as to connect alternatively the working conduits to one of said source of pressure and said reservoir, characterized in that the hydraulic distributor includes modulable return valve means in each said parallel pressure fluid flow circuit and disposed between the connection of said working conduit and said second valve means, the return valve means each mechanically coupled to said piston of said hydraulic assistance motor and actuated responsive to actuation of said hydraulic assistance motor from a rest position which actuation effects displacement of the piston of said hydraulic assistance motor, to create a restriction in an associated return circuit portion, toward said reservoir, of the chamber in relief condition of said hydraulic assistance motor, there being provided a pressure increase in said chamber in relief condition to enable effective return movement of the piston toward its rest position when the primary member is returned to its respective rest position and said hydraulic assistance motor is in a configuration different from its rest position, and each said return valve means being defined by a common slide valve member and including a pair of axially spaced annular openings cooperating with said slide valve member.

2. The distributor according to claim 1, characterized in that said axially spaced annular openings are formed in said piston of the hydraulic assistance motor.

3. The distributor according to claim 2, characterized in that the common slide value member includes a stationary valve member extending into a longitudinal recess of said piston.

4. The distributor according to claim 2, characterized in said hydraulic assistance motor is of the piston/nut type and is integrated in a steering servo unit casing.

5. The distributor according to any one of claims 1–4, of the type wherein said primary and secondary members are rotatably displaceable in relation to each other and mutually define said first and second valve means in an open center distributor arrangement, characterized in that said members define, between an input opening and an output opening, a distributor distribution cavity and a return cavity interconnected by an associated return valve means.

6. The distributor according to claim 1, characterized in that said slide valve member is formed by said piston of said motor.

7. The distributor according to claim 6, characterized in that said annular openings are formed in a cylinder of said motor and are respectively connected to said parallel circuits upstream said second valve means.

8. A combination hydraulic distributor and double-action hydraulic assistance motor having a piston separating oppositely actuatable pressure chambers, the hydraulic distributor comprising an actuating primary distributor member displaceable in relation to a secondary distributor member, said distributor members defining mutually two parallel fluid flow circuits between a source of pressure and a reservoir, working circuits each leading to an associated pressure chamber of said hydraulic assistance motor and being connected to an intermediate portion of a respective parallel pressure fluid flow circuit between first and second modulable valve means serially arranged in each said parallel pressure fluid flow circuit, said primary distributor member displaceable relative to said secondary distributor member from a relative rest position of the members to actuate said first and second valve means so as to connect alternatively, via said respective working circuits, said pressure chambers to one of said source of pressure and said reservoir, so as to displace said piston from a rest position corresponding to said rest position of said distributor members, further comprising a pair of modulable return valve means each in a respective one of said parallel fluid flow circuits and between the respective working circuit and said second valve means, said return valve means being actuatable simultaneously and responsively in phase opposition in response to any displacement of said piston from its rest position when the piston is displaced by actuation of said hydraulic distributor, such that the return valve means disposed between the pressure chamber in relief condition and said reservoir is caused to progressively close to promote a pressure increase in said chamber in relief condition and enable effective return movement of the piston towards its rest position when said distributor members are returned to their respective positions.

9. The combination of claim 8, wherein said pair of return valve means comprise a common spool valve member selectively cooperating with symmetrically arranged openings in a valve housing, one of said spool valve member and valve housing being movable together with said piston, relative to the other of said spool valve member and valve housing.

* * * * *